United States Patent
McCann et al.

(10) Patent No.: US 8,942,221 B2
(45) Date of Patent: Jan. 27, 2015

(54) CACHING NETWORK DISCOVERY RESPONSES IN WIRELESS NETWORKS

(75) Inventors: Stephen McCann, Southhampton (GB); Michael Peter Montemurro, Mississauga (CA)

(73) Assignee: BlackBerry Limited, Waterloo (CA)

( * ) Notice: Subject to any disclaimer, the term of this patent is extended or adjusted under 35 U.S.C. 154(b) by 14 days.

(21) Appl. No.: 13/407,444

(22) Filed: Feb. 28, 2012

(65) Prior Publication Data

US 2013/0121325 A1     May 16, 2013

Related U.S. Application Data

(60) Provisional application No. 61/558,270, filed on Nov. 10, 2011.

(51) Int. Cl.
*H04J 3/24* (2006.01)
*H04W 48/12* (2009.01)
*H04W 48/16* (2009.01)

(52) U.S. Cl.
CPC .............. *H04W 48/12* (2013.01); *H04W 48/16* (2013.01)
USPC ......... 370/349; 370/389; 455/434; 455/456.1

(58) Field of Classification Search
USPC .............. 370/389, 349, 310.2, 328, 338, 346; 455/434, 456.1, 435.2, 456.6
See application file for complete search history.

(56) References Cited

U.S. PATENT DOCUMENTS

| | | | |
|---|---|---|---|
| 6,493,561 B1 | 12/2002 | Hasegawa | |
| 7,010,305 B2 | 3/2006 | Immonen et al. | |
| 7,065,645 B2 | 6/2006 | Teicher | |
| 7,151,764 B1 | 12/2006 | Heinonen et al. | |
| 7,187,691 B2 | 3/2007 | Gavette | |
| 7,277,932 B2 | 10/2007 | Adachi et al. | |
| 7,606,209 B2 | 10/2009 | Watanabe | |
| 7,683,773 B1 | 3/2010 | Goodall et al. | |
| 7,684,333 B1 | 3/2010 | Dasylva et al. | |
| 8,274,908 B2 | 9/2012 | Hsin et al. | |
| 2002/0159418 A1 | 10/2002 | Rudnick et al. | |
| 2003/0103521 A1 | 6/2003 | Raphaeli et al. | |
| 2003/0134636 A1 | 7/2003 | Sundar et al. | |
| 2003/0217168 A1 | 11/2003 | Adachi et al. | |
| 2005/0097362 A1 | 5/2005 | Winget et al. | |
| 2005/0210523 A1 | 9/2005 | Parnell et al. | |

(Continued)

FOREIGN PATENT DOCUMENTS

| | | |
|---|---|---|
| EP | 1 919 154 A1 | 5/2008 |
| EP | 2 076 090 A1 | 7/2009 |

(Continued)

OTHER PUBLICATIONS

International Search Report and Written Opinion mailed Jan. 16, 2013 for PCT Application No. PCT/CA2012/050793 (9 pp.).
"Part 11: Wireless LAN Medium Access Control (MAC) and Physical Layer (PHY) Specifications; Amendment 9; Interworking with External Networks," IEEE Computer Society, IEEE Std 802.11u ™ —2011, IEEE.org; Feb. 25, 2011 (207 pp.).
Bajko, G., "Tutorial on Location and Emergency Services," IEEE, IEEE Meeting Hawaii 2008, Sep. 10, 2008, slides 1-45.

(Continued)

*Primary Examiner* — Dady Chery
(74) *Attorney, Agent, or Firm* — Brinks Gilson & Lione

(57) ABSTRACT

Network information may be discoverable without requiring a connection to that network. For example, Access Network Query Protocol ("ANQP") may allow a device to discover information about a network prior to the device associating with that network. The network discovery information may be stored in a cache memory for future associations with the same network.

22 Claims, 9 Drawing Sheets

(56) References Cited

U.S. PATENT DOCUMENTS

| | | |
|---|---|---|
| 2005/0286456 A1 | 12/2005 | McNew |
| 2006/0109113 A1 | 5/2006 | Reyes et al. |
| 2006/0221901 A1 | 10/2006 | Yaqub et al. |
| 2007/0041344 A1 | 2/2007 | Yaqub et al. |
| 2007/0064660 A1 | 3/2007 | Qi et al. |
| 2007/0124592 A1 | 5/2007 | Oyama |
| 2007/0230389 A1 | 10/2007 | Amann et al. |
| 2007/0230423 A1 | 10/2007 | Yoshida et al. |
| 2008/0031212 A1 | 2/2008 | Ogura |
| 2008/0049761 A1 | 2/2008 | Lin et al. |
| 2008/0096580 A1* | 4/2008 | Montemurro ............ 455/456.1 |
| 2008/0141031 A1 | 6/2008 | Oba et al. |
| 2008/0151796 A1 | 6/2008 | Jokela |
| 2008/0178277 A1 | 7/2008 | Oba et al. |
| 2008/0261574 A1 | 10/2008 | Rinta-Aho et al. |
| 2008/0270534 A1 | 10/2008 | Xia et al. |
| 2008/0298333 A1 | 12/2008 | Seok |
| 2009/0010399 A1 | 1/2009 | Kim et al. |
| 2009/0031138 A1 | 1/2009 | Nakhjiri |
| 2009/0047922 A1 | 2/2009 | Buckley et al. |
| 2009/0047974 A1 | 2/2009 | Quinn |
| 2009/0177759 A1 | 7/2009 | Ogawa et al. |
| 2009/0247111 A1 | 10/2009 | Sennett et al. |
| 2009/0252165 A1 | 10/2009 | Zhang et al. |
| 2009/0296688 A1 | 12/2009 | Bakker et al. |
| 2009/0296689 A1 | 12/2009 | Bakker et al. |
| 2009/0298458 A1 | 12/2009 | Bakker et al. |
| 2010/0146272 A1 | 6/2010 | Centonza et al. |
| 2010/0216434 A1 | 8/2010 | Marcellino et al. |
| 2010/0275249 A1 | 10/2010 | McCann et al. |
| 2010/0325714 A1 | 12/2010 | Iyer et al. |
| 2011/0040969 A1 | 2/2011 | Yao et al. |
| 2011/0149938 A1 | 6/2011 | Bajko |
| 2011/0280227 A1 | 11/2011 | McCann et al. |
| 2012/0243524 A1 | 9/2012 | Verma et al. |
| 2013/0012260 A1* | 1/2013 | Salkintzis et al. ......... 455/550.1 |
| 2013/0039275 A1* | 2/2013 | Patil et al. ................... 370/328 |

FOREIGN PATENT DOCUMENTS

| | | |
|---|---|---|
| EP | 2 093 967 A2 | 8/2009 |
| WO | WO 2007/083824 A1 | 7/2007 |
| WO | WO 2007/103055 A2 | 9/2007 |
| WO | WO 2009/101861 A1 | 8/2009 |
| WO | WO 2011/056307 | 5/2011 |

OTHER PUBLICATIONS

EPO Communication regarding Deficiencies in Written Opinion of the International Searching Authority dated Aug. 1, 2012 for corresponding European Application No. 10798589.7, 2 pages.
EPO Communication regarding Deficiencies in Written Opinion of the International Searching Authority dated Dec. 21, 2012 for corresponding European Application No. 11726170.1, 2 pages.
EPO Communication regarding Deficiencies in Written Opinion of the International Searching Authority dated Dec. 21, 2012 for corresponding European Application No. 11726171.9, 2 pages.
EPO Communication regarding Deficiencies in Written Opinion of the International Searching Authority dated Dec. 21, 2012 for corresponding European Application No. 11726172.7, 2 pages.
EPO Communication regarding Deficiencies in Written Opinion of the International Searching Authority dated Dec. 21, 2012 for corresponding European Application No. 11733699.0, 2 pages.
EPO Communication regarding Deficiencies in Written Opinion of the International Searching Authority dated Oct. 23, 2012 for corresponding European Application No. 11715272.8, 2 pages.
EPO Communication regarding Deficiencies in Written Opinion of the International Searching Authority dated Oct. 23, 2012 for corresponding European Application No. 11715273.6, 2 pages.
Hiller, T. et al., "A Container Type for the Extensible Authentication Protocol (EAP)," Network Working Group, Internet-Draft, <draft-hiller-eap-tlv-01.txt>, Internet Engineering Task Force Standard Working Draft, The Internet Society, May 2003, 10 pages.

IEEE P802.11 Wireless LANs, "TGae Requirements and Use Cases," Jan. 21, 2010, IEEE 802.11-10/0093r5, 6 pages.
IEEE Standard for Information Technology—Telecommunications and information exchange between systems—Local and metropolitan area networks—Specific requirements, "Part 11: Wireless LAN Medium Access Control (MAC) and Physical Layer (PHY) Specifications, Amendment 1: Radio Resource Measurement of Wireless LANs," IEEE Std 802.11k-2008, IEEE computer Society, Jun. 12, 2008, pp. 5, 58-61, 75-77, 100-105, 127 (244 pages).
IEEE Standard for Information Technology—Telecommunications and information exchange between systems—Local and metropolitan area networks—Specific requirements, "Part 11; Wireless LAN Medium Access Control (MAC) and Physical Layer (PHY) Specifications," IEEE Std 802.11-2012, Mar. 29, 2012, pp. 54, 91, 196-199, 580-584, 712-726, 742-743, 1145-1156 (2793 pages).
IEEE Standard for Information Technology, "Part 11: Wireless LAN Medium Access Control (MAC) and Physical Layer (PHY) specifications, Amendment 8: Medium Access Control (MAC) Quality of Service Enhancements," IEEE Std 802.11e—2005, Nov. 11, 2005, 211 pages.
International Preliminary Report on Patentability dated Nov. 20, 2012 for corresponding International Application No. PCT/IB2011/001006, 10 pages.
International Preliminary Report on Patentability dated Nov. 20, 2012 for corresponding International Application No. PCT/IB2011/001008, 10 pages.
International Preliminary Report on Patentability dated Nov. 20, 2012 for corresponding International Application No. PCT/IB2011/001018, 7 pages.
International Preliminary Report on Patentability dated Nov. 20, 2012 for corresponding International Application No. PCT/IB2011/001023, 6 pages.
International Preliminary Report on Patentability dated Sep. 27, 2012 for corresponding International Patent Application No. PCT/IB2011/051040, 9 pages.
International Preliminary Report on Patentability dated Sep. 27, 2012 for corresponding International Patent Application No. PCT/IB2011/051044, 9 pages.
International Search Report and Written Opinion dated Dec. 10, 2012 for corresponding International Application No. PCT/CA2012/050635, 10 pages.
International Search Report and Written Opinion dated Jul. 27, 2011 for corresponding International Application No. PCT/IB2011/001006, 14 pages.
International Search Report and Written Opinion dated Jul. 27, 2011 for corresponding International Application No. PCT/IB2011/001008, 14 pages.
International Search Report and Written Opinion dated Jun. 30, 2011 in corresponding application No. PCT/IB2011/051040, 14 pages.
International Search Report and Written Opinion dated Jun. 30, 2011 in corresponding application No. PCT/IB2011/051044, 14 pages.
International Search Report and Written Opinion dated May 9, 2011 for corresponding International Application No. PCT/IB2010/002932, 12 pages.
International Search Report and Written Opinion dated Nov. 28, 2011 for corresponding International Application No. PCT/IB2011/001018, 10 pages.
International Search Report and Written Opinion dated Oct. 5, 2011 for corresponding International Application No. PCT/IB2011/001023, 11 pages.
Li, W. et al., "A Reliable Active Scanning Scheme for the IEEE 802.11 MAC Layer Handoff," University of Cincinnati, Sep. 8, 2003, pp. 71-74.
McCann, S., IEEE P802.11, Wireless LANs, Emergency URN Information, IEEE 802.11-10/0026r1, Jan. 2010, 6 pages.
Rosen et al, "Framework for Emergency Calling Using Internet Multimedia; draft-ietf-ecrit-framework-10," IETF, Internet Society (ISOC) 4, Jul. 27, 2009, pp. 1-37.
Schulzrinne et al., "Extensions to the Emergency Services Architecture for dealing with Unauthenticated and Unauthorized Devices; draft-schulzrinne-ecrit-unauthenticated-access-06.txt," IETF, Internet Society (ISOC) 6, Oct. 26, 2009, pp. 1-23.

* cited by examiner

CACHING NETWORK DISCOVERY RESPONSES IN WIRELESS NETWORKS

PRIORITY

The application claims priority to Provisional Patent Application No. 61/558,270, filed on Nov. 10, 2011, entitled "Caching ANQP Responses In WLAN", the entire disclosure of which is hereby incorporated by reference.

BACKGROUND

Wireless network deployments, such as wireless local area networks ("WLANs"), allow wireless terminals to access network and Internet services when within proximity of wireless communication signals of those wireless networks. Through network discovery communications with the WLAN, a wireless terminal or station ("STA") may obtain network information about an access point or access network. Access Network Query Protocol ("ANQP") may allow a STA to request additional network information prior to establishing network connectivity. Such network information may include access to particular subscription service provider ("SSP") networks ("SSPN"), roaming agreements to allow connections from wireless clients associated with different SSPs, authentication capabilities to enable secure communications, support for emergency services or support for particular types of multi-media access (e.g., audio and/or video streaming, downloading, etc.). However, other network information (not provided by ANQP) may only be provided following the establishment of a connection or association with that network. Depending on the network information received, a device may need to disconnect or disassociate with that network and pursue a different network. When a device attempts to reconnect with a network, ANQP may be used again so that the network discovery information is retrieved again.

DETAILED DESCRIPTION

The disclosed systems and methods cache network discovery information that is received prior to association with that network. By caching this network discovery information, the network discovery information may be retrieved from the cache upon further attempts to associate with that network rather than requiring the network discovery information to be retransmitted. The network discovery information that may be cached may be retrieved through a wireless protocol, such as Access Network Query Protocol ("ANQP"), which allows a wireless device to retrieve information about a network prior to associating with that network. Communications prior to network association may be referred to discovery communications or communications while a wireless device (e.g., a non-access point station) is in a pre-associated state of operation in accordance with various communication standards such as the IEEE® (Institute for Electrical and Electronics Engineers) 802.11 standard. For example, as described in IEEE 802.11, a pre-associated state of a wireless device may include states such as, but not limited to, a "State 1: Initial start state, unauthenticated, unassociated" in which the device has neither authenticated or associated with a network and a "State 2: Authenticated, no associated" in which a wireless device has authenticated with a network but not yet associated with the network.

Figure 3:
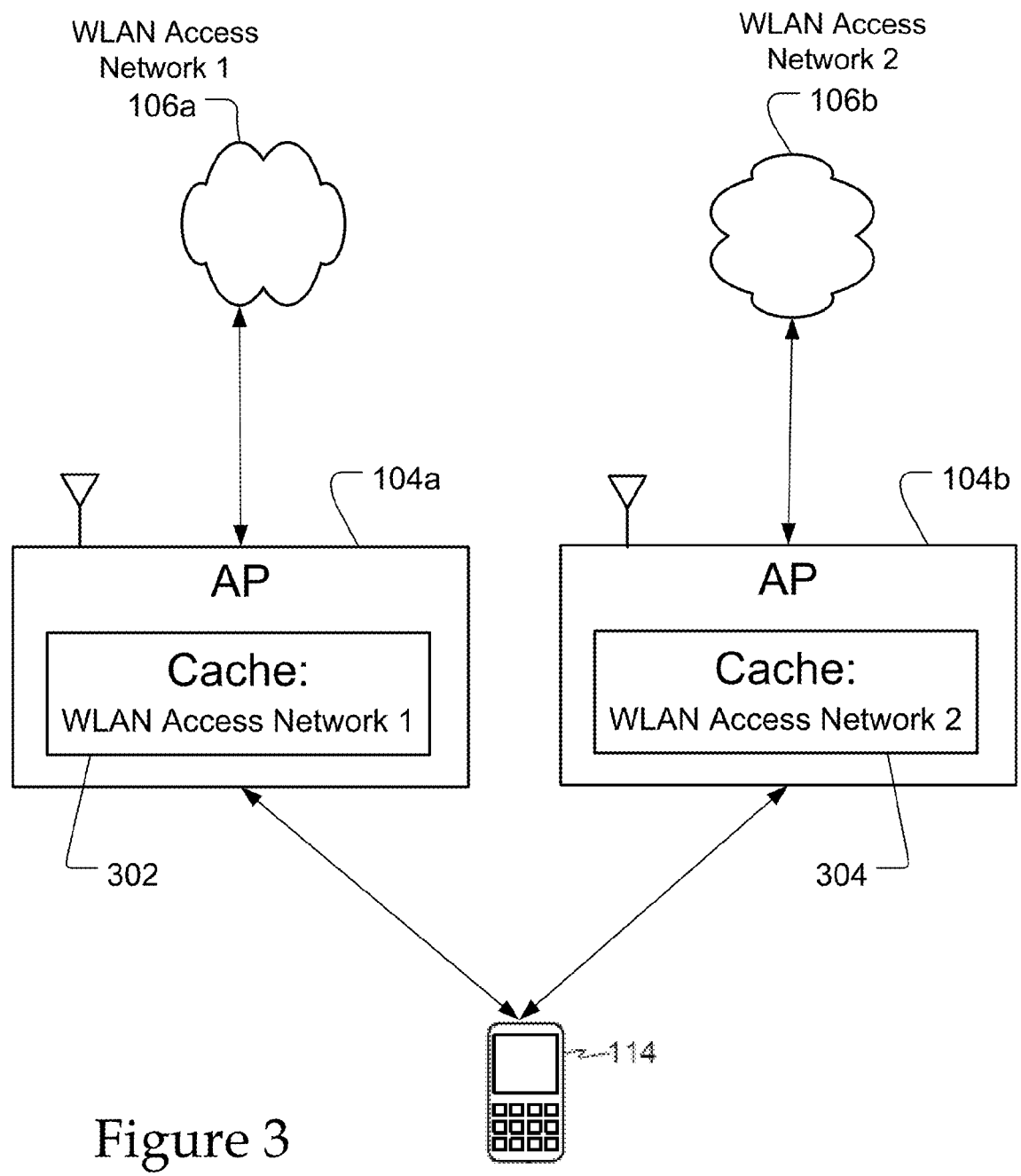
FIG. 3 illustrates an alternative communication network.
Figure 4:
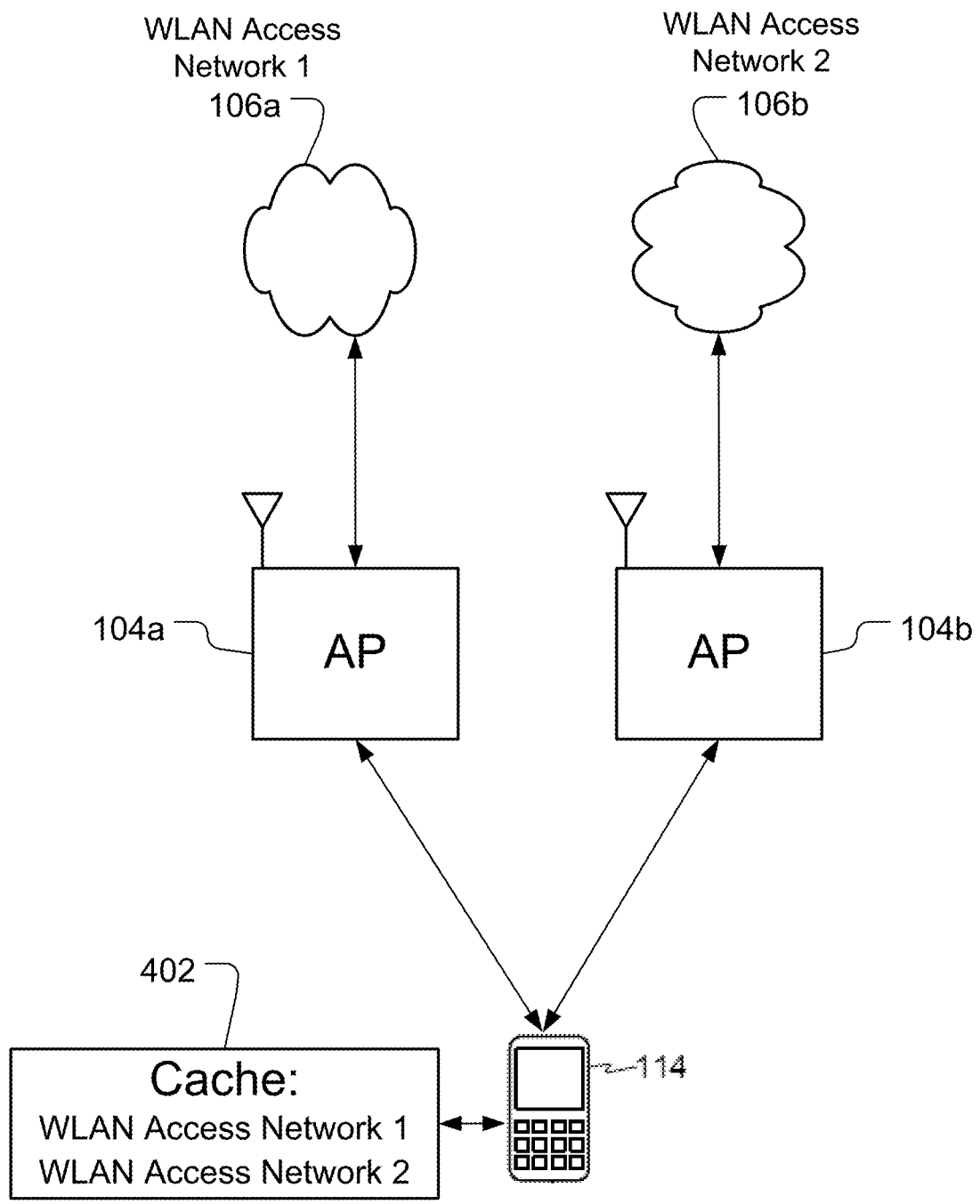
FIG. 4 illustrates another alternative communication network.

ANQP may allow a device to retrieve network information prior to establishing network capability (i.e., prior to the exchange of any authentication parameters between the device and the network as well prior to the establishment of a recognized session between the device and the network). This network information or discovery communications may be stored for any future attempts for associating with that network. FIGS. 3-4 illustrate that the cache or memory that stores the network discovery information may be on the wireless device/terminal or may be on an access point for the network.

Figure 5:
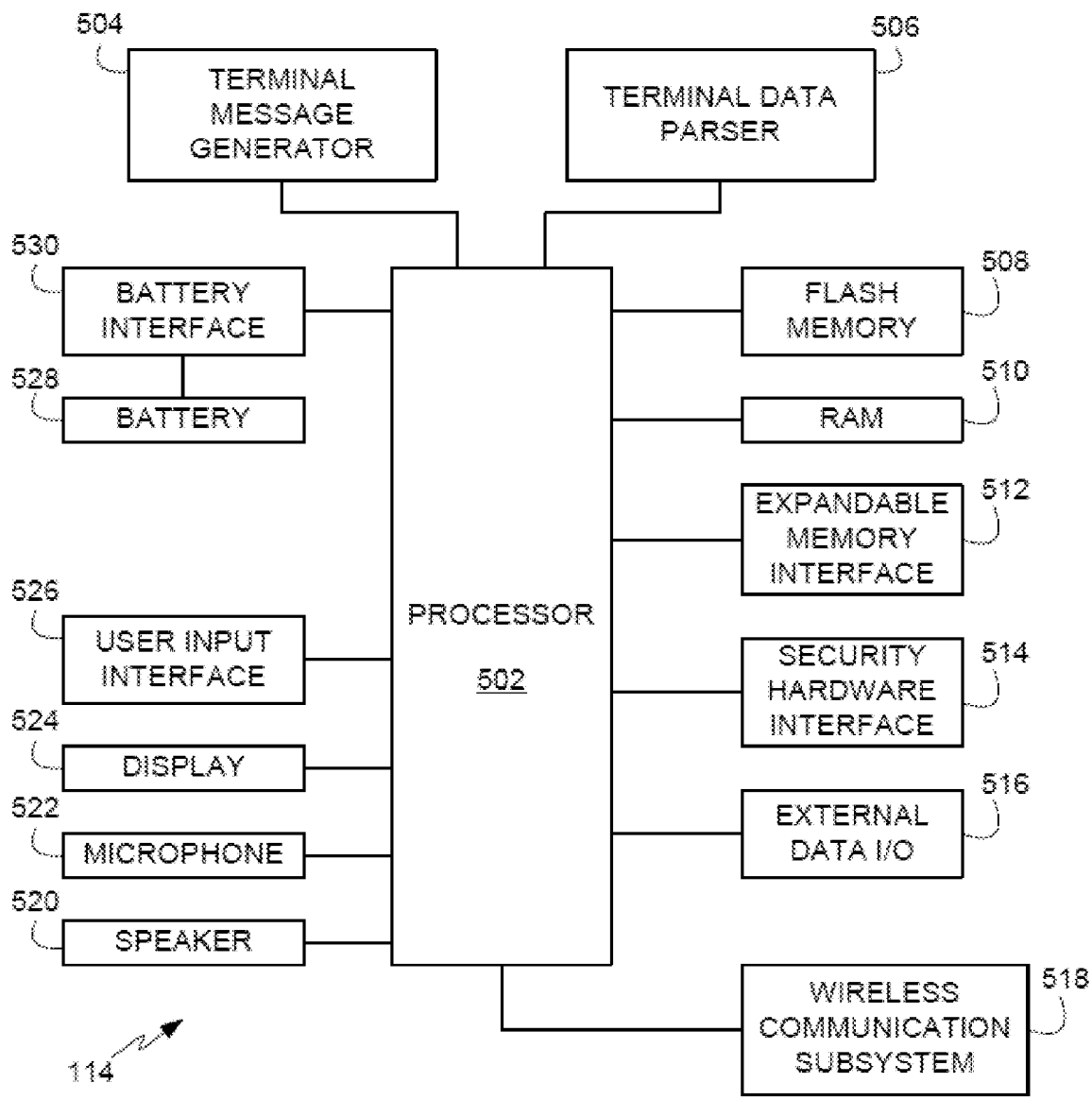
FIG. 5 illustrates a wireless terminal.

Wireless devices that communicate prior to network association may include mobile communication devices, mobile computing devices, or any other device capable of communicating wirelessly with a wireless network. Such devices may also be referred to as terminals, wireless terminals, stations ("STA") or user equipment, and may also include mobile smart phones (e.g., a BlackBerry® smart phone or BlackBerry® Playbook), wireless personal digital assistants ("PDA"), machine to machine equipment, equipment within a smart grid ("SmartGrid"), equipment within a mesh network (an ad-hoc or peer network), laptop/notebook/netbook computers with wireless adapters, etc. FIG. 5 illustrates one embodiment of a wireless device or terminal.

Some devices may discover information about the external networks (e.g., subscription service provider networks ("SSPNs")) may include a wireless local area network ("WLAN"). The network discovery and connectivity in a WLAN may occur through standards that define access, control and communications in networks, such as the communication standard known as IEEE® (Institute for Electrical and Electronics Engineers) 802.11, which, among other things, defines an amendment entitled "interworking with external networks." Alternatively, the network discovery and connectivity may be subject to other parts of the IEEE 802.11 standard and other wireless communication standards including WLAN standards including any IEEE® 802.xx standard (e.g. IEEE 802.15, IEEE 802.16, IEEE 802.19, IEEE 802.20, and IEEE 802.22), personal area network standards, wide area network standards, or cellular communication standards.

One exemplary network may be a WLAN and is described below. Alternatively, the devices may discover information about other networks through other protocols and architectures, including a cellular network or a WiMax network. The network may comprise a publicly accessible network, such as the Internet, a private network, such as an intranet, or combinations thereof, and may utilize a variety of networking protocols now available or later developed including, but not limited to TCP/IP based networking protocols. The networks may include any communication method or employ any form of machine-readable media for communicating information from one device to another.

The discovery of network information may be implemented in many environments providing WLAN access for network connectivity or in WLAN access locations or environments in which it may be expected that one or more users carrying respective wireless terminals will associate with (i.e., join or connect to) and disassociate from a wireless network, access point, or WLAN as they enter and exit the WLAN access locations or environments.

In a WLAN environment, network discovery may include, for example, an active scan procedure or passive scan procedure performed by the wireless terminal. Typically, scanning procedures within a WLAN environment involve scanning for (i.e., determining) candidate stations (e.g., access point stations or mesh stations) with which the wireless terminal may associate with during an association procedure or re-associate with during a re-association procedure. In a passive scan procedure, a wireless terminal may "listen for" (i.e., receive or detect) beacon frames periodically transmitted from another station (e.g., an access point or mesh station). In an active scan procedure, the wireless terminal generates one or more probe request frames. A station (e.g., an access point or mesh station) that receives a probe request frame, in response, transmits a probe response frame. The wireless terminal then processes any received probe response frames.

In some WLAN environments, network discovery may further include an IEEE 802.11 authentication procedure. In other words, network discovery may include a successful authentication, an unsuccessful authentication, or a deauthentication of a wireless terminal with one of the stations that were identified during the scanning procedure discussed above. Stated another way, network discovery may include: a transition of the wireless terminal from "State 1" to "State 2" based on a successful authentication of the wireless terminal; an unchanged state (i.e., remaining in "State 1") of the wireless terminal if authentication of the wireless terminal was unsuccessful; or a transition of the wireless terminal from "State 2" to "State 1" based on a deauthentication of the wireless terminal.

Some WLAN locations or environments may be known as "hotspots" in reference to a location or environment that is within communication range of WLAN signals. WLAN locations or environments may include coffee shops, retail stores, home locations (e.g. homes and apartments), educational facilities, office environments, airports, public transportation stations and vehicles, hotels, etc. Such WLANs are often implemented as access networks that provide access to publicly accessible networks and may be associated with, or support access to, external networks (or WLAN-supported networks) owned and/or operated by subscription-based service providers. For example, an external network can be owned and/or operated by an Internet-access service provider or a telecommunications carrier/service provider that provides subscription-based Internet access for a fee (e.g., a monthly fee). In some systems, a subscriber/user may subscribe to such a service can use wireless network access and/or Internet-access services based on such a subscription when the subscriber is in communication proximity of the WLAN with an appropriate wireless terminal. In some instances, different WLANs may provide access to different types of network information. For example, some WLANs may provide access to particular subscription service provider networks, and some WLANs may support roaming agreements to allow connections from wireless terminals associated with different SSPs.

During some network discovery processes a wireless terminal may transmit a query for certain network information from the wireless local area network ("WLAN"). The terminal may obtain network information made available by WLANs to determine, based on the network information, whether to continue with a connection process to associate with that network. As described below, this network information may stored in a cache so that future discovery requests of the same network or access point may be unnecessary.

In accordance with the embodiments described herein, wireless terminals may request network information from WLANs using an Access Network Query Protocol ("ANQP"). ANQP supports information retrieval from an Advertisement Server that supports a Generic Advertisement Service ("GAS"). ANQP and GAS are defined in IEEE® 802.11u™ and also IEEE® 802.11-2012™, the entire disclosures of which is incorporated by reference.

Generic Advertisement Service ("GAS") may serve as a transport mechanism, at layer-2 (see e.g. FIG. 2), for an advertisement protocol. The advertisement protocol may connect the wireless terminal to one of several interworked servers. The advertisement protocol allows the transmission of frames between a wireless terminal device and a server in the network prior to network connectivity. For example, GAS provides support for operations such as network selection by a wireless terminal, as well as for communication between the wireless terminal and other information resources in the network before the wireless terminal associates with a WLAN. The wireless terminal may be connected to a layer-2 radio service, without exchanging any authentication parameters or without having a recognized session (because no session keys are established and no internet protocol address is assigned). When in compliance with the IEEE 802.11 standard, no data traffic is allowed in this state.

Other layer-2 transport mechanisms or even authentication mechanisms may be used. For example, the Extensible Authentication Protocol ("EAP") may be used to carry the advertisement protocol, as an alternative to GAS. The advertisement protocol information would be encapsulated within a suitable EAP-TLV (type length value) method frame (or alternative EAP method frame) and transported by the EAP. Use of secure credentials exchanged during the EAP transactions would also provide a level of security for any information carried within the advertisement protocol. For example, if any EAP method using SIM based credentials (e.g. EAP-SIM, EAP-AKA, or EAP-AKA) were to be the authentication protocol, any advertisement protocol information encapsulated (i.e. securely carried) within a suitable EAP-TLV frame during the same EAP transaction may also be protected by the SIM credentials.

Access Network Query Protocol ("ANQP") is an advertisement protocol and operates as a query and response protocol used by a wireless terminal to discover a range of information from a server including accessible roaming partners, internet protocol address type, and other metadata useful in the wireless terminal's network selection process. ANQP is capable of discovering information about hotspots or wireless networks, prior to the wireless terminal establishing network connectivity and associating with that network. In addition to being defined in IEEE® 802.11u, additional ANQP messages may alternatively or additionally be defined in the Wi-Fi Alliance ("WFA") Hotspot 2.0 specifications, alternatively known as Wi-Fi Certified PassPoint. The WFA Hotspot 2.0 may also be referred to as WFA PassPoint. These ANQP extensions within the WFA Hotspot 2.0 specifications may be referred to as Hotspot ("HS") 2.0 ANQP elements. Alternatively, other advertisement protocols (e.g., Registered Location Query Protocol "RLQP" as defined in IEEE® 802.11af and Hotspot Registration Protocol (HRP) as defined in WFA Hotspot 2.0 specifications) may also be used. ANQP provides one embodiment for communication with a WLAN at the discovery stage without requiring an association with the network. Network information that is communicated prior to network association (e.g., at the network discovery stage) may be cached for future reference and is discussed below. In alternative embodiments, other layer-2 transport mechanisms or even authentication mechanisms such as the Extensible Authentication Protocol (EAP) could be used to carry the ANQP messages, as an alternative to GAS. The ANQP message would be encapsulated within a suitable EAP-TLV method frame (or alternative EAP method frame) and transported by the EAP.

A network discovery exchange may involve a requesting wireless terminal to query another wireless terminal (e.g., a WLAN access point ("AP")) for network information. A WLAN AP (also referred to simply as an AP) is an entity that contains one station and provides access to distribution services via a wireless medium for associated stations. The queried or receiving terminal (e.g., an AP) may respond to the received query with the requested information in a response. The queried or receiving terminal can provide the response information with or without proxying the query to a server in an external network (e.g., a subscription service provider ("SSP") network). For example, an external network connected to a queried WLAN may have certain network information accessible via the WLAN and of which a querying wireless terminal may be made aware. The network discovery exchange or communications prior to network association may use ANQP or other query protocols. The information transmitted as part of this network discovery exchange may be stored in a cache once it is received. This information may be retrieved from the cache rather than requiring future requests for the same information.

Figure 1:
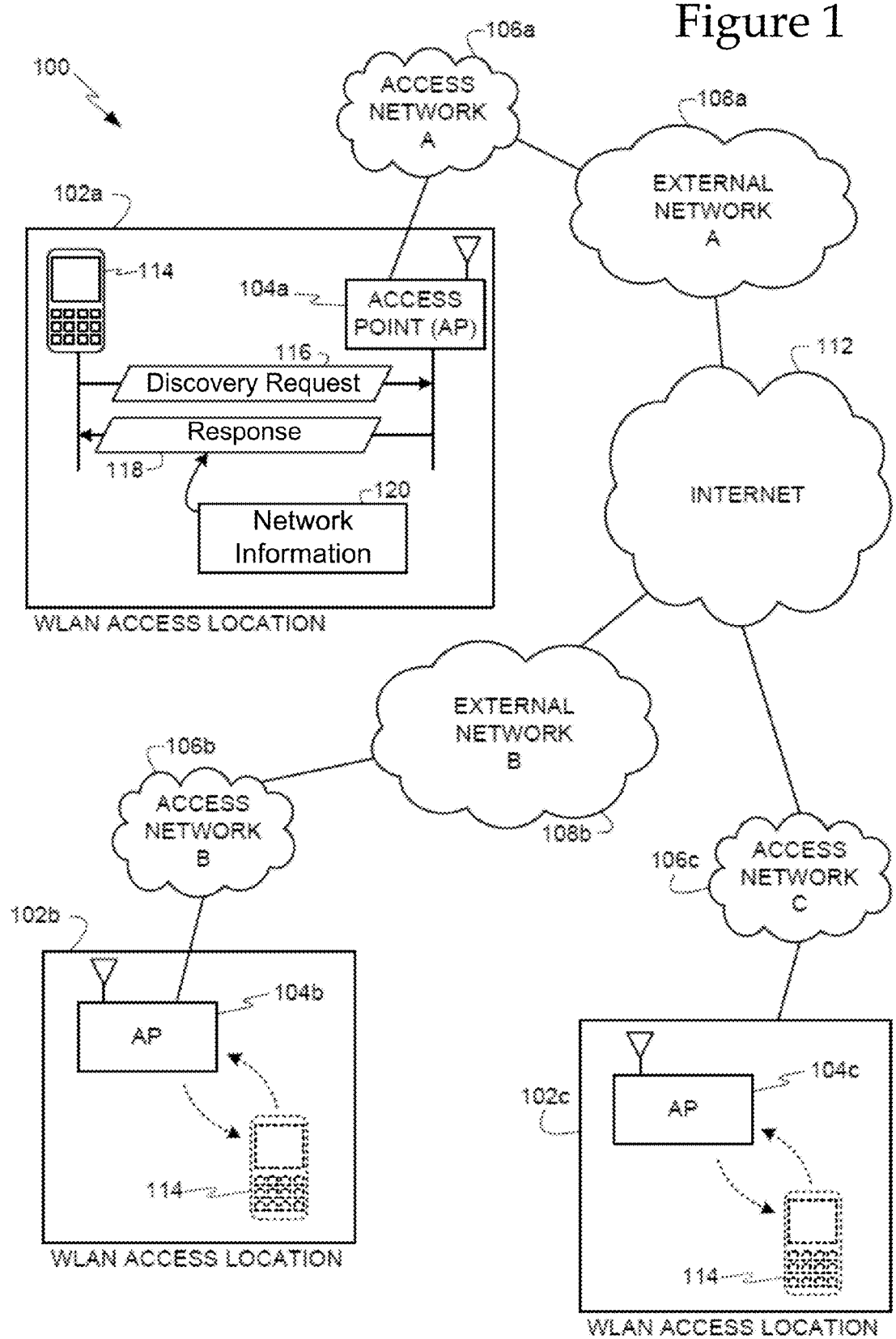
FIG. 1 illustrates a communication network.

FIG. 1 illustrates a communication network 100. Network information may be communicated during network discovery using ANQP over the communications network 100. The communication network 100 includes a plurality of WLAN access locations 102a-c having respective access points ("APs") 104a-c that provide access to respective access networks 106a-c. The APs 104a-c are further described with respect to FIG. 6. The access network A 106a provides access to an external network A 108a and the access network B 106b provides access to an external network B 108b. Unlike the access networks A 106a and B 106b that do not connect directly to the Internet 112, the access network C 110 may connect directly to a publicly accessible network like the Internet. Thus, the access network C 106c may be a public network, while the access networks A 106a and B 106b may be private networks.

In one embodiment, each of the external networks A 108a and B 108b may be a subscription service provider network ("SSPN") owned or operated by data subscription service providers, Internet subscription service providers, media (e.g., audio/video) subscription service providers, wireless communications subscription service providers, or any combination thereof. The external networks A 108a and B 108b are connected to the Internet 112 and may, for example, provide subscription-based Internet access to wireless terminal devices. In some implementations, roaming agreements between different subscription service providers may enable the external networks A 108a and B 108b to support roaming connections for wireless terminals associated with other subscription service providers.

The WLAN access location 102a illustrates a wireless terminal 114 in wireless range of the access point ("AP") 104a. The wireless terminal 114 is further described with respect to FIG. 5. The AP 104a connects with the access network A 106a, which may provide a direct or indirect connection to other networks, including publicly accessible network like the Internet 112. Prior to the wireless terminal 114 associating with the access network A 106a, wireless terminal 114 sends a discovery request 116 to the AP 104a. The AP 104a may respond with a discovery response 118. In alternative embodiments, the discovery request 116 may originate from the AP 104a (as an AP is also an entity that contains a wireless terminal) and the discovery response 118 may be from the wireless terminal 114, such as with mesh, peer to peer, ad-hoc or Wi-Fi direct networks. The discovery request 116 and the discovery response 118 may be referred to as discovery communications and may include network information 120. The network information 120 may include information about the network and/or device that is communicated between the device and the network prior to the device associating with the network. In one embodiment, the network information 120 may be communicated using the ANQP protocol. The network information 120 may be stored in a cache with the wireless terminal 114 or with the AP 104 as discussed with respect to FIGS. 3-4. The cache may eliminate the need for future discovery requests 116 and discovery responses 118 for the same network.

The discovery communications (request 116 and response 118) may be exchanged at a media access control ("MAC") sub-layer of a data link layer of the Open Systems Interconnection ("OSI") Reference Model without needing to use operations at or above an internet protocol ("IP") layer (i.e., a network layer) and without needing to otherwise provide access to the IP layer while discovering network information 120. Discovering network information using messages exchanged at or above the network layer may require more processing power for a wireless terminal than implementing processes at the MAC sub-layer. The layers in which the discovery communication operates are further illustrated in FIG. 2.

Each of the APs 104a-c and the wireless terminal 114 may include a network adapter or network interface card that facilitates connections to a wireless medium. The network interface component may be referred to as a station ("STA"). Each of the access networks 106a-c and the external networks 108a-b may be associated with and/or provide access to different network information. The network information 120 may include discovery information that is provided by a network prior to the association with that network. The network information may be set by respective owners or operators of the networks 106a-c, 108a, and 108b based on different factors such as, for example, subscription usage plans, desired security levels, business objectives, roaming agreements, supported emergency services, supported multi-media access, available Internet access, etc.

The wireless terminal 114 may associate with different APs (e.g., the APs 104a-c) based at least partially on the network information 120 received regarding the available external networks. The wireless terminal 114 may receive information from the APs when moved in range of one of the WLAN access locations 102a-c, respectively. The wireless terminal 114 can dynamically discover network information available at any of the WLAN access locations 102a-c and may process that information when electing whether to associate with one of the APs 104a-c.

Figure 2:
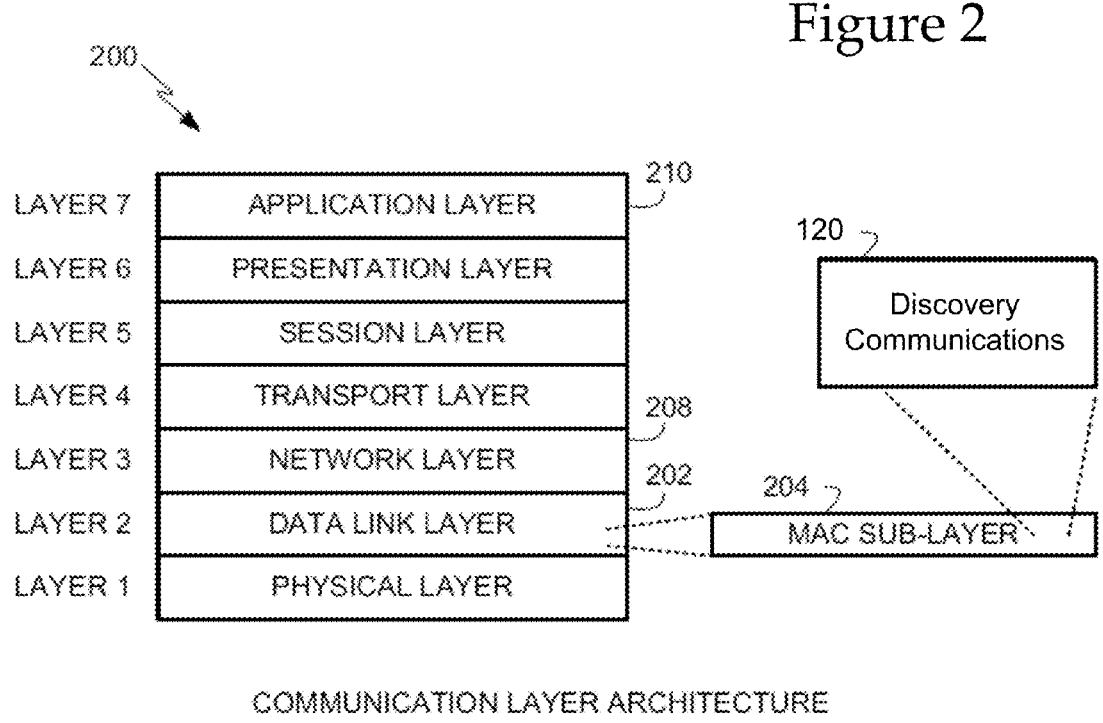
FIG. 2 illustrates a communication layer architecture.

FIG. 2 illustrates a communication layer architecture 200. The communication layer architecture 200 includes seven layers which may be implemented in accordance with the Open Systems Interconnection ("OSI") Reference Model. The communication layer architecture 200 includes a data link layer 202, which includes a media access control ("MAC") sub-layer 204. Wireless terminal devices (e.g., the wireless terminal 114 of FIG. 1) may provide network information or discovery communications 120 (e.g. the discovery request 116 and the discovery response 118) with wireless access points (e.g., the wireless access points 102a-c of FIG. 1) at the MAC sub-layer 204. A wireless terminal device may access information from a cache memory or other hardware of the wireless terminal at the MAC sub-layer 204 without needing to perform operations at or above an internet protocol layer (e.g., a network layer 208) and without needing to provide access to the internet protocol layer. Mobile wireless terminal devices (e.g., the wireless terminal 114 of FIG. 1) that include mobile smart phones, PDA's, processor based devices, etc. may have relatively limited processor cycles and less available electrical power than fixed-location computing devices powered using wired (e.g. alternating current) electricity sources. Low-level resource operations at the MAC sub-layer require relatively fewer system resources than user-interface-intensive and operating system intensive operations (e.g., web-browser operations) at an application layer.

Discovering network information available via access points using the MAC sub-layer may be used for identifying suitable connections between a wireless terminal and an access point. This connection may occur without user involvement or with minimal user involvement. The network information 120 may indicate whether a particular network (e.g., a SSPN) would be suitable to associate with. Making this determination prior to an association with the network may substantially reduce or eliminate user frustration because the user would not need to engage in any attempts to associate with or connect to a particular access point when the access point or network does not meet the particular network capability requirements of the wireless terminal 114, thereby substantially enhancing the user experience. Communicating such attributes or characteristics prior to a persistent or non-continuous network connection may improve network bandwidth while reducing user frustration. With fewer users attempting connections (e.g., session access) network throughput may increase for those serviced by the network. Moreover, those users that cannot sustain or maintain a connection may avoid the challenges of initiating or establishing such a connection. However, communicating network information 120 requires resources and time, which may be eliminated or reduced if the network information 120 is stored in a cache for future access.

Some communications or authentication techniques that use hypertext transfer protocol ("HTTP") or other internet protocol processes may require establishing a connection between a wireless terminal and a wireless access point at one or more of the layers between and including the network layer 208 and an application layer 210 of the communication layer architecture 200. In these applications, discovery communications 120 may not require a connection or access to the network layer 208 or any layers within a protocol suite. An inclusion of a discovery communication 120 on the MAC sub-layer 204 may allow for a wireless terminal to communicate with a network without associating with the network.

Figure 7:
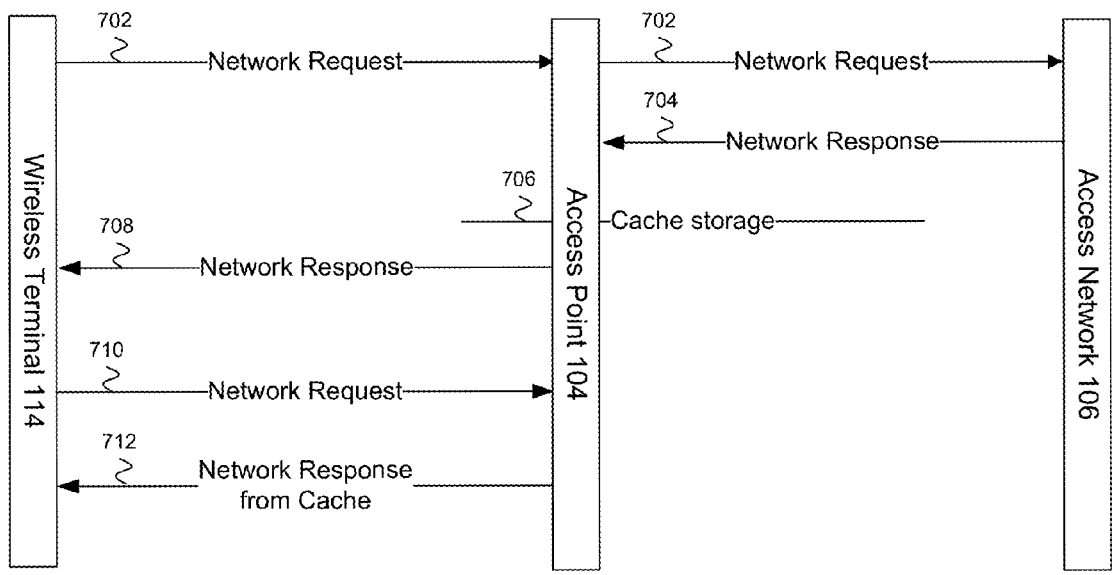
FIG. 7 illustrates an example of network communication.

FIG. 3 illustrates an alternative communication network with a cache at both of the access points 104a, 104b. AP 104a provides access to WLAN access network 1 106a and AP 104b provides access to WLAN access network 2 106b with AP 104b The wireless terminal 114 is physically located within the range of both access point 104a and access point 104b. The wireless terminal 114 may communicate with both WLAN access networks 106a, 106b, through their respective access points 104a, 104b. The wireless terminal 114 may receive network discovery information 120 from both networks without associating with either network. In other words, the wireless terminal 114 may receive the network discovery information 120 while in a pre-associated state. Once this network information 120 is received by the AP 104a, it may be stored in the cache 302. Likewise, once this network information 120 is received by the AP 104b, it may be stored in the cache 304. Accordingly, when a wireless terminal, such as the wireless terminal 114, communicates with the access point 104a, the access point 104a may utilize the network information 120 stored in its cache 302 for such pre-association communications. Likewise, when a wireless terminal, such as the wireless terminal 114, communicates with the access point 104b, the access point 104b may utilize the network information 120 stored in its cache 304 for such pre-association communications. FIG. 7 further illustrates the process of storing the network information in the cache at the AP and retrieving that information from the cache.

Figure 8:
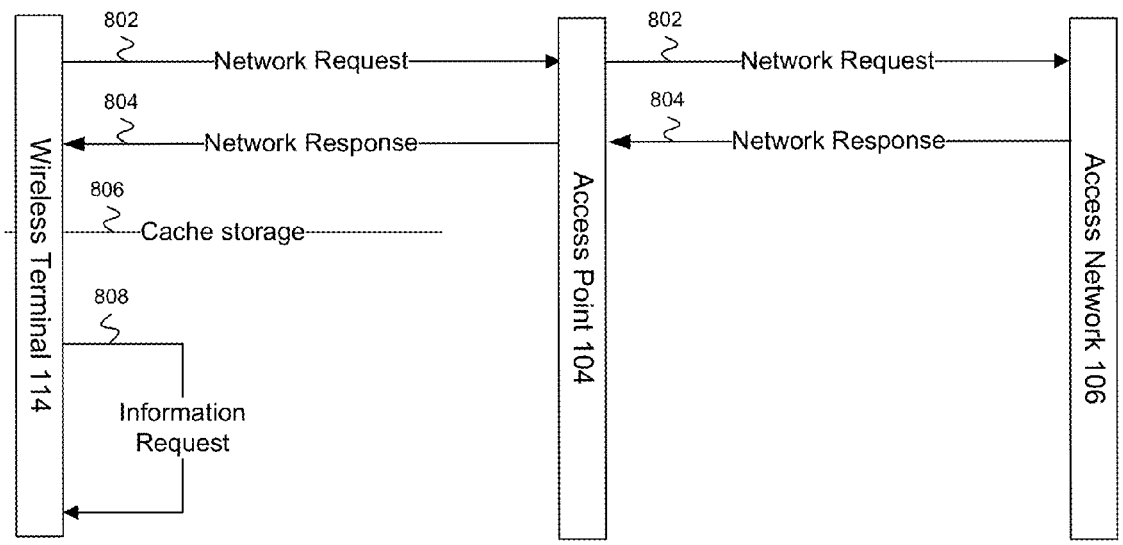
FIG. 8 illustrates another example of network communication.

FIG. 4 illustrates another alternative communication network with the cache at the wireless terminal 114. In FIG. 4, the cache 402 is illustrated as being part of the wireless terminal 114. The cache 402 may store network information 120 that may be retrieved from the cache 402 rather than requested and received from the WLAN access network. In particular, wireless terminal 114 may connect with WLAN access network 106a through access point 104a, or may connect with WLAN access network 106b through access point 104b. Upon initial or discovery communications with the access networks, the wireless terminal 114 may store that information in its cache 402. Accordingly, when the wireless terminal 114 encounters either of the access points 104a, 104b in the future, the discovery information (e.g. network information 120) may just be retrieved from the cache 402 rather than reinitiating discovery communications. FIG. 8 further illustrates the process of storing the network information in the cache of the AP and retrieving that information from the cache.

FIG. 5 illustrates a wireless terminal 114 as shown in FIGS. 1, 3, and 4. The wireless terminal 114 includes a processor 502 that may be used to control the overall operation of the wireless terminal 114. The processor 502 may be implemented using a controller, a general purpose processor, a digital signal processor, dedicated hardware, or any combination thereof. The processor 502 may include a central processing unit, a graphics processing unit, a digital signal processor or other type of processing device. The processor 502 may be a component in any one of a variety of systems. For example, the processor 502 may be part of a standard personal computer or a workstation. The processor 502 may be one or more general processors, digital signal processors, application specific integrated circuits, field programmable gate arrays, servers, networks, digital circuits, analog circuits, combinations thereof, or other now known or later developed devices for analyzing and processing data. The processor 502 may operate in conjunction with a software program, such as code generated manually (i.e., programmed).

The wireless terminal 114 also includes a terminal message generator 504 and a terminal data parser 506. The terminal message generator 504 may generate network information discovery messages such as the discovery request 116 and discover response 118 for communicating the network information 120 from FIG. 1. The terminal data parser 506 may be used to retrieve network information from memory or cache (e.g., random access memory 510, etc.). For example, the terminal data parser 506 may retrieve network information 120 that is cached in the wireless terminal 114 after receipt from a WLAN (e.g., the access networks 106a-c of FIG. 1).

In the illustrated embodiment, the terminal message generator 504 and the terminal data parser 506 are shown as separate from and connected to the processor 502. In alternative embodiments, the terminal message generator 504 and the terminal data parser 506 may be implemented in the processor 502 and/or in a wireless communication subsystem (e.g., a wireless communication subsystem 518). The terminal message generator 504 and the terminal data parser 506 may be implemented using any combination of hardware, firmware, and/or software. For example, one or more integrated circuits, discrete semiconductor components, and/or passive electronic components may be used. For example, the terminal message generator 504 and the terminal data parser 506, or parts thereof, may be implemented using one or more circuits, programmable processors, application specific integrated circuits, programmable logic devices, field programmable logic devices, etc.

The terminal message generator 504 and the terminal data parser 506, or parts thereof, may be implemented using instructions, code, and/or other software and/or firmware, etc. stored on a machine accessible medium and executable by, for example, a processor (e.g., the processor 502). The terminal message generator 504 or the terminal data parser 506 may be stored on or include a tangible storage medium, memory, or cache. For example, the terminal message generator 504 or the terminal data parser 506 may be implemented in software stored on a memory that is executable by the processor 502. Alternatively, the terminal message generator 504 and/or the terminal data parser 506 may be implemented in hardware with software functions. The cache or memory for storing the network information and/or for storing software associated with the terminal message generator 504 and/or the terminal data parser 506 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. In one embodiment, the memory may include the random access memory 510 for the processor 502, or may be an external storage device or database for storing recorded ad or user data. Exemplary memory or cache may include a flash memory, solid-state memory, hard drive, compact disc ("CD"), digital video disc ("DVD"), memory card, memory stick, floppy disc, universal serial bus ("USB") memory device, or any other device operative to store ad or user data. The memory is operable to store instructions executable by the processor 502.

The wireless terminal 114 may include a FLASH memory 508, a random access memory 510, and/or an expandable memory interface 512 coupled with the processor 502. The cache may be part of the random access memory 510, the FLASH memory 508, or another memory storage location. The FLASH memory 508 may store computer readable instructions and/or data. The FLASH memory 508 and/or the RAM 510 may be a cache that stores the network information 120 and/or instructions for communicating that network information 120. The processor 502 may be coupled with the memory (e.g. the FLASH memory 508, or the RAM 510) for storing software instructions executable by the processor 502. The processor 502 may be coupled with the cache for retrieving stored network information 120 in a pre-associated state rather than requesting that information from the network. The memory and/or cache may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. In one embodiment, the cache is part of the memory. The functions, acts or tasks illustrated in the figures or described herein may be performed by the programmed processor 502 executing the instructions stored in the memory. The functions, acts or tasks are independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The wireless terminal 114 may include a security hardware interface 514 to receive a SIM card (or USIM, UICC, eUICC) from a wireless service provider. A SIM card may be used following network discovery communications including authentication of the wireless terminal 114 for establishing a connection with a WLAN-supported network. The wireless terminal 114 may be provided with an external data I/O interface 516. The external data I/O interface 516 may be used by a user to transfer information to the wireless terminal 114 through a wired medium.

The wireless terminal 114 may include wireless communication subsystem 518 to enable wireless communications with access points (e.g., the access points 104a-c of FIG. 1). Although not shown, the wireless terminal 114 may also have a long-range communication subsystem to receive messages from, and send messages to, a cellular wireless network. In the illustrated examples described herein, the wireless communication subsystem 518 can be configured in accordance with the IEEE® 802.11 standard. In other example implementations, the wireless communication subsystem 518 may be implemented using a BLUETOOTH® radio, a ZIGBEE® device, a wireless USB device, an ultra-wideband radio, a Near Field Communications ("NFC") device, or a Radio Frequency Identifier ("RFID") device.

The wireless terminal 114 may include a user interface for communicating with the wireless terminal. The user interface may be separate component or it may include a speaker 520, a microphone 522, a display 524, and a user input interface 526. The display 524 may be a liquid crystal display, an organic light emitting diode, a flat panel display, a solid state display, a cathode ray tube, a projector, a printer or other now known or later developed display device for outputting determined information. The user input interface 526 may include alphanumeric keyboard and/or telephone-type keypad, a multi-direction actuator or roller wheel with dynamic button pressing capability, a touch panel, etc. The network discovery information that is communicated with a network prior to connection may be communicated with or without each of the user interfaces described herein. The speaker, 520, the microphone 522, the display 524, the user input interface 526, and/or any combination thereof may be omitted in alternative embodiments. In one embodiment, the wireless terminal 114 is a battery-powered device and includes a battery 528 and a battery interface 530.

Figure 6:
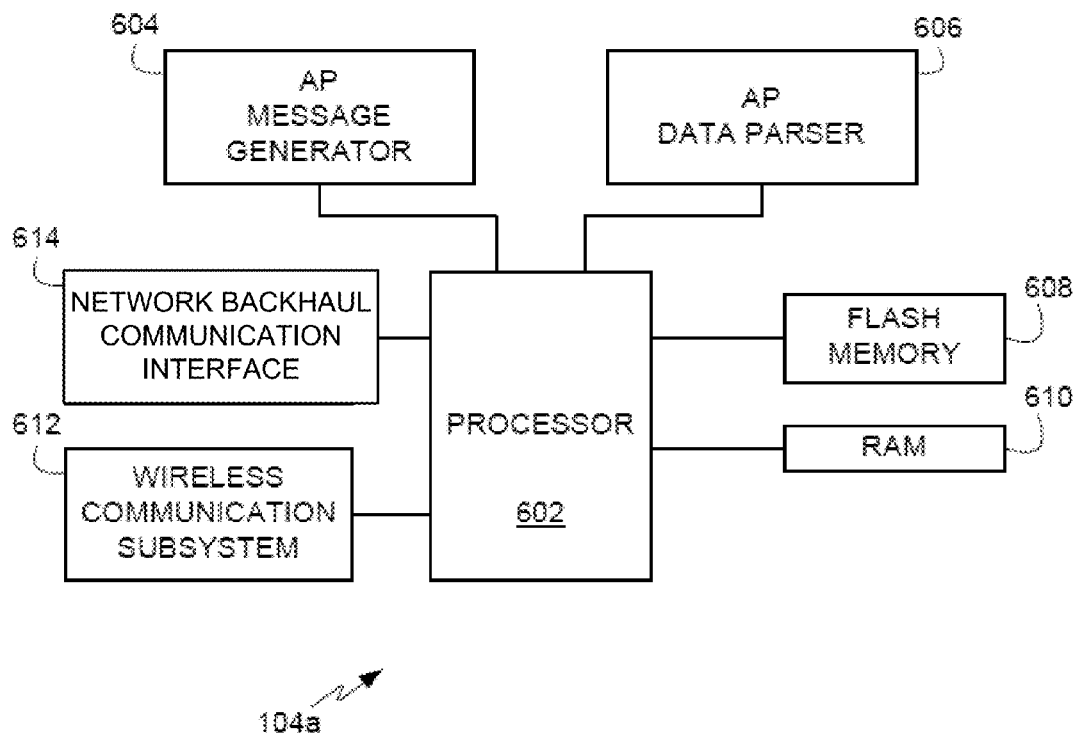
FIG. 6 illustrates an access point.

FIG. 6 illustrates an access point ("AP") 104a. The access point shown in FIG. 6 is AP 104a, but may also be illustrative of other access points (e.g. access points 104b, 104c). AP 104a includes a processor 602 to perform operations of the AP 104a. The processor 602 may be similar to the processor 502 described above.

The AP 104a includes an access point message generator 604 to generate network information communications and an access point data parser 606 for retrieving network information communications from the wireless terminal 114 and/or the external network A 108a as illustrated in FIG. 1. The access point message generator 604 may be similar to the terminal message generator 504 of FIG. 5, and the access point data parser 606 may be similar to the terminal data parser 506 of FIG. 5. As with the terminal message generator 504 and the terminal data parser 506 of FIG. 5, the access point message generator 604 and the access point data parser 606 may be implemented in software stored on a memory that is executable by the processor 602 or may be implemented in hardware with software functions executed by the processor 602. Alternatively, the access point message generator 604 and the access point data parser 606 may be implemented in a wireless communication subsystem (e.g., a wireless communication subsystem 612) using any combination of hardware, firmware, and/or software including instructions stored on a tangible computer readable medium and/or a non-transitory computer readable medium.

The AP 104a may include a memory (e.g. a FLASH memory 608 and a RAM 610) that includes a cache for storing network information for future reference. In alternative embodiments, the cache may be a separate memory on the AP 104a. Both of the FLASH memory 608 and the RAM 610 are coupled to the processor 602. The FLASH memory 608 and/or the random access memory ("RAM") 610 may be configured to store network information (e.g., network information 120 including discovery communications from FIG. 1) in a cache for future reference. The RAM 610 may also be used to generate messages for communication with the wireless terminal 114 and/or to the external network A 108a. The RAM 610 may also store received messages communicated by the wireless terminal 114 and/or the external network A 108a.

To communicate with wireless terminals such as the wireless terminal 114, the AP 104a may include a wireless communication subsystem 612, which may be similar to the wireless communication subsystem 518 of the wireless terminal 114 illustrated in FIG. 5. To communicate with a WLAN-supported network or external network (e.g., the networks 106a-c, 108a, and 108b of FIG. 1), the AP 104a may include a network backhaul communications interface 614.

Figure 9:
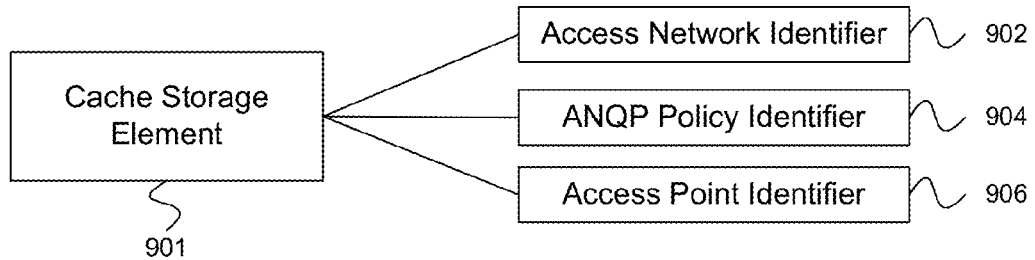
FIG. 9 illustrates exemplary cache storage elements.

FIG. 7 illustrates an example of network communication. The wireless terminal 114 requests 702 network information 120 from the access point 104 and the access network 106. The access network 106 responds 704 to the request with the requested network information 120. However, before that information is passed to the wireless terminal 114, it is stored in cache 706. Once the information is stored in cache, future network requests 710 will receive a network response from the cache 712. In other words, the network information 120 is stored in the cache 706 so that future network requests 710 may not need to communicate with the access network 106 to retrieve that information. Communications during network discovery (request 702 and response 704), i.e. network information 120, may relate to information obtained during network discovery or in pre-associated state before the wireless terminal 114 is associated with the network. Network discovery may refer to the communications or messages that occur before the network is connected or associate with. In one embodiment, the discovery communications may be according to the access network query protocol ("ANQP") that enables discovery communications in WLANs. As discussed below, FIG. 9 illustrates exemplary embodiments of what network discovery data the cache may store and how the cache may store that data. In alternative embodiments, the request may originate from the access point 104 and the response may originate from the wireless terminal 114. For example, for the device identification, the access point 104 may request identification from the wireless terminal 114.

FIG. 8 illustrates another example of network communication. The wireless terminal 114 requests 802 network information 120 from the access point 104 and the access network 106. The access network 106 responds 804 to the request with the requested network information 120. When the network response 804 is received at the wireless terminal 114, the received information is stored in the cache 806. Since the network information 120 is stored in the cache at the wireless terminal 114, there may not be a need for future discovery communications with the access point 104 about the access network 106. When the wireless terminal 114 needs network information 120 about the access network 106, it may submit an internal message or information request 808 that first checks the cache for that information. When that network information 120 is located in the cache the wireless terminal 114 may not need future discovery or pre-association communications with the access point 104. In other words, future encounters with the access network 106 from the wireless terminal 114 may not require discovery communications because the network information 120 about that network is already stored in the cache.

In one embodiment, the network information that is stored in the cache may include a timer or expiration period that determines the time for which the information is valid. In some embodiments, the network information 120 may be changed periodically, so the data stored in the cache may be different from the current information. When the expiration time or timer has expired, the network information stored in the cache may no longer be used and that information is then retrieved from the network rather than the version stored in the cache. This aging process may be implemented to remove older cached network information (e.g. existing ANQP Query responses) after a reasonable amount of time (e.g. 7 days or 1 month).

The network information 120 described above may include ANQP communications. For example, the systems and methods described herein may allow the caching of ANQP responses, from the local access network, in the WLAN terminal. The WLAN terminal performs an ANQP query upon an initial visit to a WLAN and caches the response. It stores the ANQP response in memory that can be indexed by a suitable identifier or any other information or combination of parameters that uniquely defines the hotspot as described below with respect to FIG. 9. Upon a future visit to the same hotspot (or the same WLAN) the cached ANQP response may be used, as opposed to requesting new information. ANQP may be used as only one example advertisement protocol within this document. Although ANQP is described as an exemplary embodiment of the systems and methods below, other advertisement protocols such as Registered Location Query Protocol (RLQP) and Hotspot Registration Protocol (HRP) may be used also. Likewise, the other advertisement protocols may be used, such as EAP rather than GAS.

FIG. 9 illustrates exemplary cache storage elements 901. In one embodiment, an access network identifier 902 may be used for storing data in the cache. As discussed above, in a particular access network, an ANQP response is cached or stored in a memory element of the WLAN terminal or WLAN AP using an identifier that is unique to that access network. In one embodiment, the access network identifier 902 may be a Homogeneous Extended Service Set Identifier (HESSID). The HESSID may be used in identifying WLAN Extended Service Sets (ESS) and may be similar in format to a Media Access Control (MAC) address. The HESSID may be an identifier of the network behind the layer 2 wireless route and may be used in conjunction with a Service Set Identifier (SSID), which is the existing WLAN radio access identifier. Both HESSID and SSID may be used together to discover a specific WLAN and its network attachment.

When the WLAN terminal visits any access network where the identifier is different from the current one, due to motion or entering access network coverage, the cache may be checked to see if an entry for this new identifier exists. If an entry exists and the age of the information has not timed out, the WLAN terminal may use the cached information, as opposed to transmitting new ANQP requests to the hotspot AP. Alternatively, manual override options in the WLAN terminal may prevent this behaviour, allowing ANQP requests to be always sent. In other examples, the cache may be part of the AP.

The cache may implemented as a table (or small database) within a memory element of the WLAN terminal or AP, possibly including an eUICC or similar secure entity. An exemplary embodiment of the cache implementation is shown in Table 1:

TABLE 1

Example Cache Implementation in a WLAN terminal

| ANQP information | Identifier | Cache Timestamp | Cache Lifetime |
|---|---|---|---|
| NAI Realm | HESSID | 2011-10-12 13:08 | 1 hour |
| Venue Name | HESSID | 2008-03-07 22:18 | 1 week |

The information from each different type of ANQP message may be stored separately using the identifier. Table 1 illustrates exemplary ANQP information or network information 120 which may be stored in the cache. NAI Realm and Venue Name may be examples of ANQP messages defined in IEEE 802.11. The NAI Realm may provide a list of network access identifier (NAI) realms corresponding to entities whose networks or services are accessible via this hotspot AP, e.g. "alphatel.com". The Venue Name may provide zero or more venue names associated with the WLAN access network, e.g. "hospital". Both of these ANQP messages may contain fixed information that does not vary over time.

The WLAN terminal may determine which ANQP messages or network information to cache. For example the network information 120 or ANQP messages that are cached may include "WAN metrics" which may produce different information about WAN parameters every time it is requested, so that a cache of such information may not be useful. In one embodiment, the cache timestamp format may be Universal Time (UT). The cache lifetime may be WLAN terminal dependant value assigned to each ANQP information entry. Using the cache timestamp value in conjunction with the cache lifetime/expiration, the WLAN terminal may decide whether the ANQP information is out of date or not.

Figure 10:
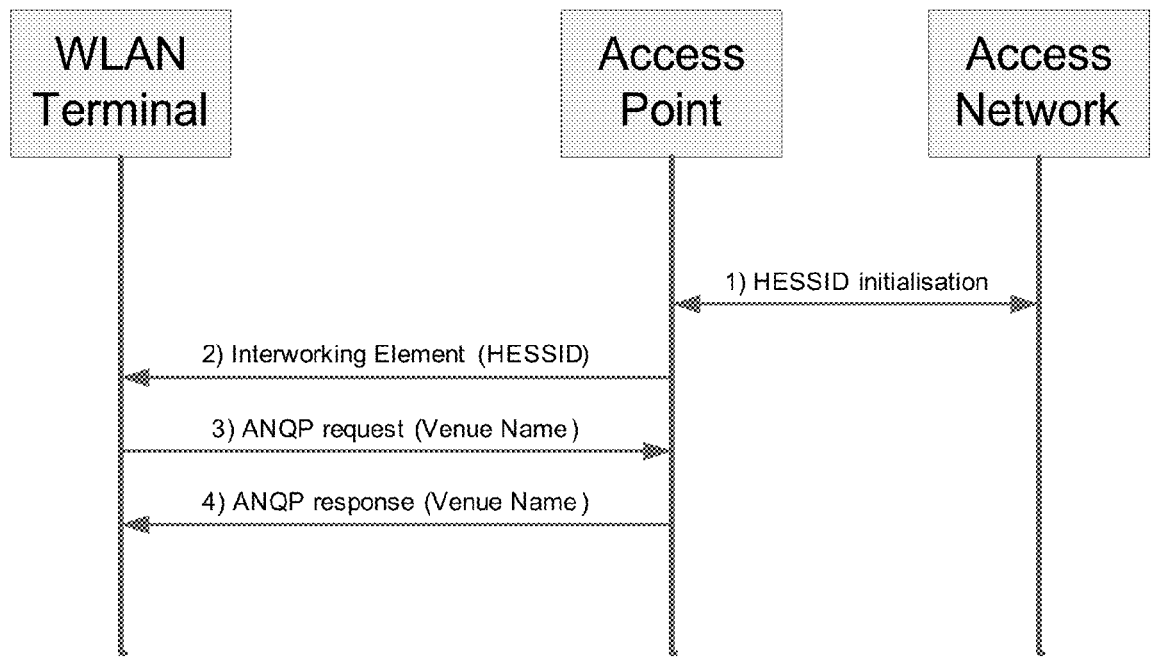
FIG. 10 illustrates an exemplary sequence with an access network identifier.

FIG. 10 illustrates an exemplary sequence with an access network identifier. In particular, a message sequence is illustrated that allows ANQP information to be cached within the WLAN terminal. The WLAN terminal may be the wireless terminal 114, the access point may be any of the access points 104, and the access network may be any of the access networks 106.

In FIG. 10, each access point within the access network may be initialized with a common HESSID that is unique to that access network and acts as an identifier. Each access point may transmit the HESSID within an interworking element, either within a Beacon or a Probe Response or as an ANQP response. When a process within the terminal requires some ANQP information (e.g. network discovery or network information 120), it may check its internal cache using the HESSID, to determine whether this information is already known from that access network. If the cache does not have an entry, or if the entry has expired or timed out, the ANQP request is transmitted to the access point. When an ANQP response is received at the WLAN terminal, the cache is re-populated with the information stored in memory and a copy is sent internally to the requesting process.

Referring back to FIG. 9, another cache storage element is an ANQP policy identifier 904. The ANQP policy identifier may uniquely define an ANQP policy for the access network. The policy identifier may identify policies that may be transmitted as discovery communications or network information 120 and will be described below as an ANQP message or communication for simplicity. In a particular access network, an ANQP policy identifier may represent a current policy of the information in that access network. The policy may be data or a value that is something that can be changed by a hotspot provider. In one example, a policy may be the cost or access restrictions for a particular hotspot. The ANQP policy identifier may be an integer value that is incremented each time the policy of the access network changes. The ANQP Policy identifier may be a value that represents a set of semi-static information within the access network. If the information within the access network changes, the value of the ANQP Policy may change (typically a 1 octet integer value that is incremented by 1, rolling back to 0 when the value is at maximum.) This allows a WLAN terminal to decide whether its cache of ANQP information needs to be updated or not. The ANQP Policy identifier may be changed by an entity within the access network, when information is updated. The WLAN terminal may have a separate mechanism to determine whether its cache holds information that has expired or timed out.

As discussed above for the access network identifier 902, when the WLAN terminal visits any access network where the identifier is different from the current one, due to motion or entering access network coverage, the cache may be checked to see if an entry for this new identifier exists. If an entry exists and the age of the information has not timed out, the WLAN terminal may use the cached information, as opposed to transmitting new ANQP requests to the hotspot.

The ANQP policy identifier may also be a modified WFA Hotspot 2.0 element. The ANQP Policy identifier may be carried within the WFA Hotspot 2.0 Indication element as shown in Table 2:

TABLE 2

WFA Hotspot 2.0 Indication element format

| - | Element ID | Length | OI | Type | ANQP Policy Identifier |
|---|---|---|---|---|---|
| Octets: | 1 | 1 | 3 | 1 | 1 |

An alternative implementation is shown in Table 3:

TABLE 3

Alternative WFA Hotspot 2.0 Indication element format

| | Element ID | Length | OI | Type | Hotspot Configuration |
|---|---|---|---|---|---|
| Octets: | 1 | 1 | 3 | 1 | 1 |

The hotspot configuration field in Table 3 may be stored as indicated in Table 4:

TABLE 4

Hotspot Configuration field format

| | B0 | B1 | | B7 |
|---|---|---|---|---|
| | DGAF Disabled | ANQP Policy identifier | | |
| Bits: | 1 | 7 | | |

In Table 4, the ANQP Policy identifier is only a 7 bit integer, but it may operate as described above. The ANQP Policy identifier value may be modified in other ways, such as resetting to 0 every 24 hours (or every hour in Europe) if the mobile device is operating under TV White Spaces regulations. Additionally, an indication of the type of change may also be provided, so that the mobile device may be able to correct the cached information without requiring another ANQP request.

The policy identifier may be included in Beacon and Probe Response frames sent by the AP infrastructure to a WLAN terminal. The WLAN terminal may read the ANQP Policy identifier field and compare the value of the identifier to the value stored in the cache to determine whether an ANQP query is required to obtain new ANQP query information (e.g. network information 120) for that network. The cached ANQP query information may apply to all ANQP Information IDs (Info IDs) or a subset of the ANQP information ID's, for example Info IDs of just the ANQP messages used for WFA Hotspot 2.0.

The cache may implemented as a table (or small database) within a memory element of the WLAN terminal or AP, possibly including an eUICC or similar secure entity. An exemplary embodiment of the cache implementation is shown in Table 5. In particular, Table 5 illustrates exemplary ANQP information or network information 120 that may be stored in the cache along with the ANQP policy identifier.

TABLE 5

Example Cache Implementation in a WLAN terminal

| ANQP information | Identifier | Cache Timestamp | Cache Lifetime |
|---|---|---|---|
| NAI Realm | ANQP Policy | 2011-10-12 13:08 | 1 hour |
| Venue Name | ANQP Policy | 2008-03-07 22:18 | 1 week |

Figure 11:
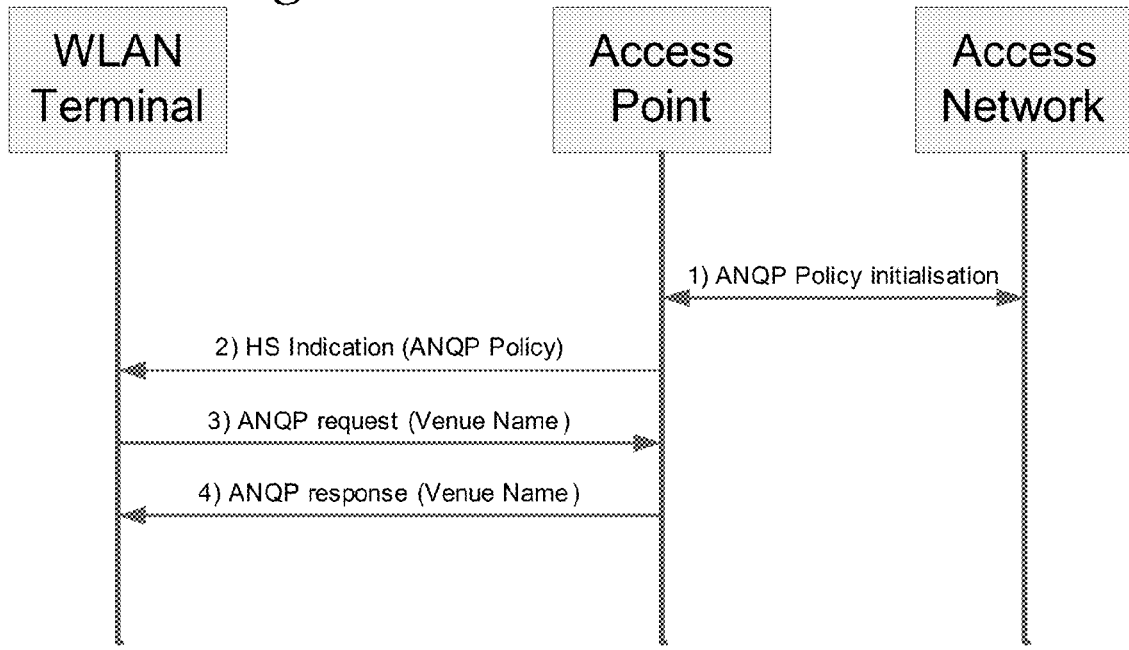
FIG. 11 illustrates an exemplary sequence with a policy identifier.

FIG. 11 illustrates an exemplary sequence with an ANQP policy identifier 904. In particular, a message sequence is illustrated that allows network information to be cached within the WLAN terminal. In alternative embodiments, the cache may be stored with the access point. Each access point within the access network may be initialized with a common ANQP Policy value that is unique to that access network and acts as an identifier. Each access point may transmit the current ANQP Policy identifier within an interworking element, either within a Beacon or Probe Response or as an ANQP response. In one embodiment, the hotspot indication or ANQP policy may be broadcast by the access point. The WLAN terminal may then just listen to the broadcast message from the access point. When a process within the terminal requires some network information 120 (e.g. ANQP information for network discovery), it checks an internal cache using the ANQP Policy, to determine whether this information is already known. The policy is used to identify different networks and distinguish which stored information relates to which network. If the cache does not have an entry, or if the entry has expired or timed out, the ANQP request may be transmitted to the access point. When an ANQP response is received at the WLAN terminal, the cache may be re-populated with the information and a copy is sent internally to the requesting process.

Referring back to FIG. 9, another cache storage element is an access point identifier 906. The access point identifier 906 may be unique to an access point. Exemplary AP identifiers include a basic service set identifier (BSSID), service set identifier (SSID), and/or access point location. The BSSID may be unique for each access point and may include a unique serial number for the access point. Conversely, the HESSID discussed above may be an identifier for the overall network. The access point location may be a global position system (GPS) location by coordinates or other location identifier. The AP identifier may be a BSSID that is transmitted within the access point beacon or in response to a probe request or an ANQP response or be some other unique parameter of the access point such as AP location. In the case of AP location, a WLAN terminal may transmit an ANQP AP location request to determine this information, and then use the ANQP response to check its internal cache. The ANQP messages may be used by the WLAN terminal to provide the location of the access point.

The system and methods herein may add further capabilities to a WLAN terminal regarding network discovery information for WLAN hotspots prior to network connectivity. In particular, the cache may store network information corresponding to different AP's which are identified using the AP identifiers to distinguish the cached information. This may improve the user experience of WLAN hotspot connectivity through the use of improved algorithms for network selection in the WLAN terminal. The use of cached information will also reduce response times for visited WLAN hotspots and save power.

The cache may implemented as a table (or small database) within a memory element of the WLAN terminal or AP, possibly including an eUICC or similar secure entity. An exemplary embodiment of the cache implementation is shown in Table 6. In particular, Table 6 illustrates exemplary ANQP information or network information 120 that may be stored in the cache along with the access point identifier.

TABLE 6

Example Cache Implementation in a WLAN terminal

| ANQP information | AP Identifier | Cache Timestamp | Cache Lifetime |
|---|---|---|---|
| NAI Realm | AP Location | 2011-10-12 13:08 | 1 hour |
| Venue Name | BSSID | 2008-03-07 22:18 | 1 week |

The information from each different type of ANQP message may be stored separately using the AP identifier. The WLAN terminal may determine which ANQP messages to cache, as not all messages may need to be cached. One example of data that might not be relevant to cache is "WAN metrics" which may produce different information about WAN parameters each time it is requested, so that a cache of such information may not be useful. The cache timestamp format is UT (Universal Time). The cache lifetime is a WLAN terminal dependant value assigned to each ANQP information entry. Using the cache timestamp value in conjunction with the cache lifetime/expiration, the WLAN terminal can decide whether the ANQP information is expired.

Figure 12:
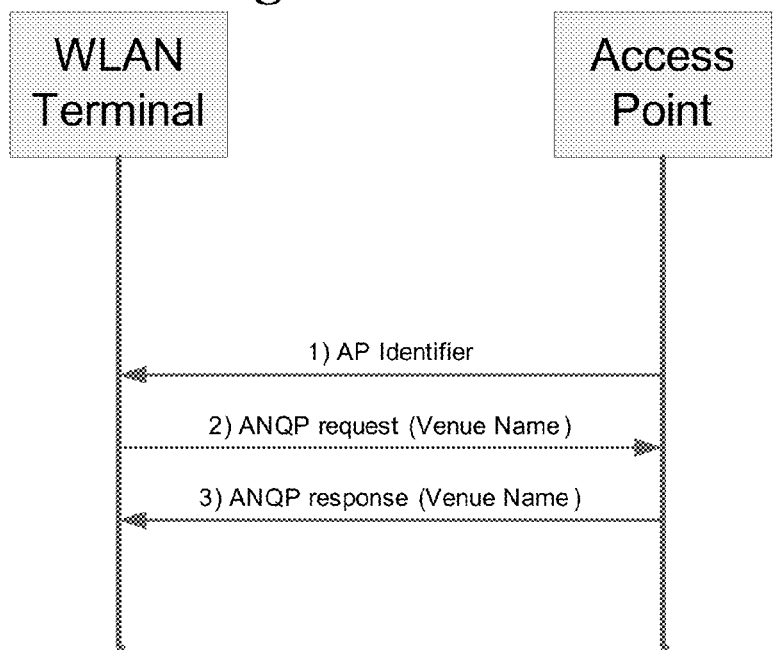
FIG. 12 illustrates an exemplary sequence with an access point identifier.

FIG. 12 illustrates an exemplary sequence with an access point identifier 906. In particular, a message sequence is illustrated that allows network information to be cached within the WLAN terminal. In alternative embodiments, the cache may be stored with the access point. Each access point within the access network may be initialized with an access point value that is unique to that access point and acts as an identifier. FIG. 12 illustrates that the access point transmits an AP identifier that is unique to that access point. When a process within the terminal requires some network information 120 (e.g. ANQP or network discovery information), it checks its internal cache using the AP identifier, to determine whether this information is already known. If the cache does not have an entry, or if the entry has expired or timed out, the ANQP request may be transmitted to the access point. When an ANQP response is received at the WLAN terminal, the cache is re-populated with the information and a copy is sent internally to the requesting process.

The system and process described may be encoded in a signal bearing medium, a computer readable medium such as a memory, programmed within a device such as one or more integrated circuits, and one or more processors or processed by a controller or a computer. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The invention claimed is:

1. A method for communicating in a wireless network comprising:
    transmitting, prior to network association, a request to a first wireless network for pre-association information about the first wireless network, wherein the request comprises an access network query protocol ("ANQP") message;
    receiving, prior to network association, a response from the first wireless network, including the pre-association information, wherein the response comprises an ANQP message;
    storing the ANQP message response in a cache; and
    indexing the cached ANQP message response for future associations with the first wireless network.

2. The method of claim 1 wherein the request and the response comprise Advertisement Protocol messages.

3. The method of claim 2 wherein the Advertisement Protocol messages are carried by extensible authentication protocol.

4. The method of claim 2 wherein pre-association information comprises an identifier, wherein the identifier comprises an access network identifier, an access network query protocol ("ANQP") identifier, an access point identifier, or an access point location.

5. The method of claim 1, further comprising:
    storing the received pre-association information in the cache for future associations with the first wireless network.

6. The method of claim 1 wherein the stored pre-association information comprises an expiration time after which the pre-association information is no longer valid.

7. The method of claim 1 wherein the transmitting and receiving prior to network association occurs during network discovery.

8. The method of claim 1 further comprising:
    identifying, prior to network association, the first wireless network within range; and
    checking the cache memory for the pre-association information about the first wireless network.

9. The method of claim 8 further comprising:
associating, after receiving the pre-association information from the cache, with the first wireless network.

10. A method for accessing information about wireless networks comprising:
identifying a wireless network within a range;
checking, prior to network association, for network discovery information about the wireless network stored in a cache, wherein the network discovery information comprises an identifier for the wireless network that comprises at least one of an access network identifier, an access network query protocol ("ANQP") identifier, or an access point identifier;
retrieving, prior to network association, the network discovery information from the cache when the network discovery information is stored in the cache, wherein the identifier is used to associate with the wireless network; and
requesting, prior to network association, the network discovery information from the wireless network when the network discovery information is not stored in the cache, wherein the identifier is provided in response to the requesting for storage in the cache.

11. The method of claim 10 wherein the requesting and the response are communicated according to Advertisement Protocol.

12. The method of claim 10 wherein the checking further comprises verifying that when the network discovery information is stored in the cache it is not expired.

13. The method of claim 10 further comprising:
associating with the wireless networks based on the network discovery information.

14. The method of claim 10 wherein the cache comprises a table storing information for a plurality of wireless networks include an identifier for each of those wireless networks.

15. The method of claim 14 wherein the identifier comprises an index for referencing the wireless networks stored in the cache.

16. The method of claim 14 wherein the ANQP identifier is carried by an ANQP element.

17. The method of claim 14 wherein the wireless network is part of a basic service set ("BSS") or an extended service set ("ESS") with the wireless network.

18. The method of claim 17 wherein the access network identifier comprises a BSS identifier ("BSSID").

19. A device comprising:
a processor configured to:
determine, prior to network association, when the device is in range of a first wireless network;
check, prior to network association, a cache memory for access network query protocol ("ANQP") network discovery information about the first wireless network, wherein the ANQP network discovery information comprises ANQP response messages;
access, prior to network association, the ANQP network discovery information about the first wireless network when that ANQP network discovery information is stored in the cache memory; and
request, with an access network query protocol ("ANQP") message prior to network association, the ANQP network discovery information about the first wireless network when that ANQP network discovery information is not stored in the cache memory.

20. The device of claim 19 wherein a response to the request comprises an access network query protocol ("ANQP") messages.

21. The device of claim 20 wherein the ANQP messages are carried by extensible authentication protocol.

22. The device of claim 19 further comprising:
associating with the first wireless network based on the ANQP network discovery information about the first wireless network.

* * * * *